United States Patent [19]
Palansky et al.

[11] Patent Number: 5,303,616
[45] Date of Patent: Apr. 19, 1994

[54] ELECTRONICALLY CONTROLLED BYPASS CLUTCH BASED ON PERCENT-SHIFT-COMPLETION FOR A TORQUE CONVERTER

[75] Inventors: Bruce J. Palansky, Livonia; Thomas L. Greene, Plymouth; John A. Daubenmier, Canton, all of Mich.; Gavin F. McCall, Withim, England; Lawrence H. Buch, Farmington Hills; Paul F. Smith, Dearborn Heights, both of Mich.

[73] Assignee: Ford Motor Company, Dearborn, Mich.

[21] Appl. No.: 927,046

[22] Filed: Aug. 10, 1992

[51] Int. Cl.⁵ .................. F16H 45/02; F16D 47/02
[52] U.S. Cl. .................. 74/890; 192/3.31; 74/867
[58] Field of Search ............ 74/890; 192/3.3, 3.31; 364/424.1

[56] References Cited

U.S. PATENT DOCUMENTS

| | | | |
|---|---|---|---|
| 3,277,744 | 10/1966 | Stockton | 74/677 |
| 4,224,837 | 9/1980 | Croswhite | 74/688 |
| 4,637,281 | 1/1987 | Vanselous | 74/869 |
| 4,665,770 | 5/1987 | Vanselous | 74/733 |
| 4,724,939 | 2/1988 | Lockhart et al. | 192/3.31 X |
| 4,757,886 | 7/1988 | Brown et al. | 192/3.3 |
| 4,934,216 | 6/1990 | Sandel et al. | 475/59 |
| 4,953,091 | 8/1990 | Baltusis et al. | 192/3.31 X |
| 4,978,328 | 12/1990 | Pierce | 475/66 |
| 4,993,527 | 2/1991 | Benford et al. | 74/890 X |
| 5,029,087 | 7/1991 | Cowan et al. | 364/424.1 |
| 5,046,178 | 9/1991 | Hibner et al. | 364/424.1 |
| 5,060,769 | 10/1991 | Yoshimura et al. | 192/3.31 X |
| 5,081,886 | 1/1992 | Person et al. | 74/866 |
| 5,083,481 | 1/1992 | Smith et al. | 74/869 |
| 5,086,670 | 2/1992 | Nitz et al. | 364/424.1 X |
| 5,115,897 | 5/1992 | Yoshimura et al. | 74/890 X |

Primary Examiner—Leslie A. Braun
Assistant Examiner—Khoi Ta
Attorney, Agent, or Firm—Roger L. May; Frank G. McKenzie

[57] ABSTRACT

A multiple ratio automatic transmission having a hydrokinetic torque converter in an automotive vehicle driveline wherein the torque converter has a controllable bypass clutch and wherein provision is made for changing the clutch capacity during a ratio change to reduce undesirable torque fluctuations in the driveline, thus improving shift quality while maintaining optimum hydrodynamic torque converter efficiency.

2 Claims, 11 Drawing Sheets

| GEAR | CT1 | CT2 | CT3 | CT4 | B1 | B2 | DRIVE OWC1 | DRIVE OWC2 | COAST OWC1 | COAST OWC2 | RATIO |
|---|---|---|---|---|---|---|---|---|---|---|---|
| 1M | X | | X | | | X | X | | | X | 2.779 |
| 1D | X | | | | | X | X | | O/R | | 2.779 |
| 2 | X | X | | | | X | O/R | | O/R | | 1.512 |
| 3 | X | X | X | | | | | X | X | | 1.000 |
| 4 | | X | X | | X | | | O/R | | O/R | .712 |
| R | X | | X | X | | | X | | | X | 2.474 |

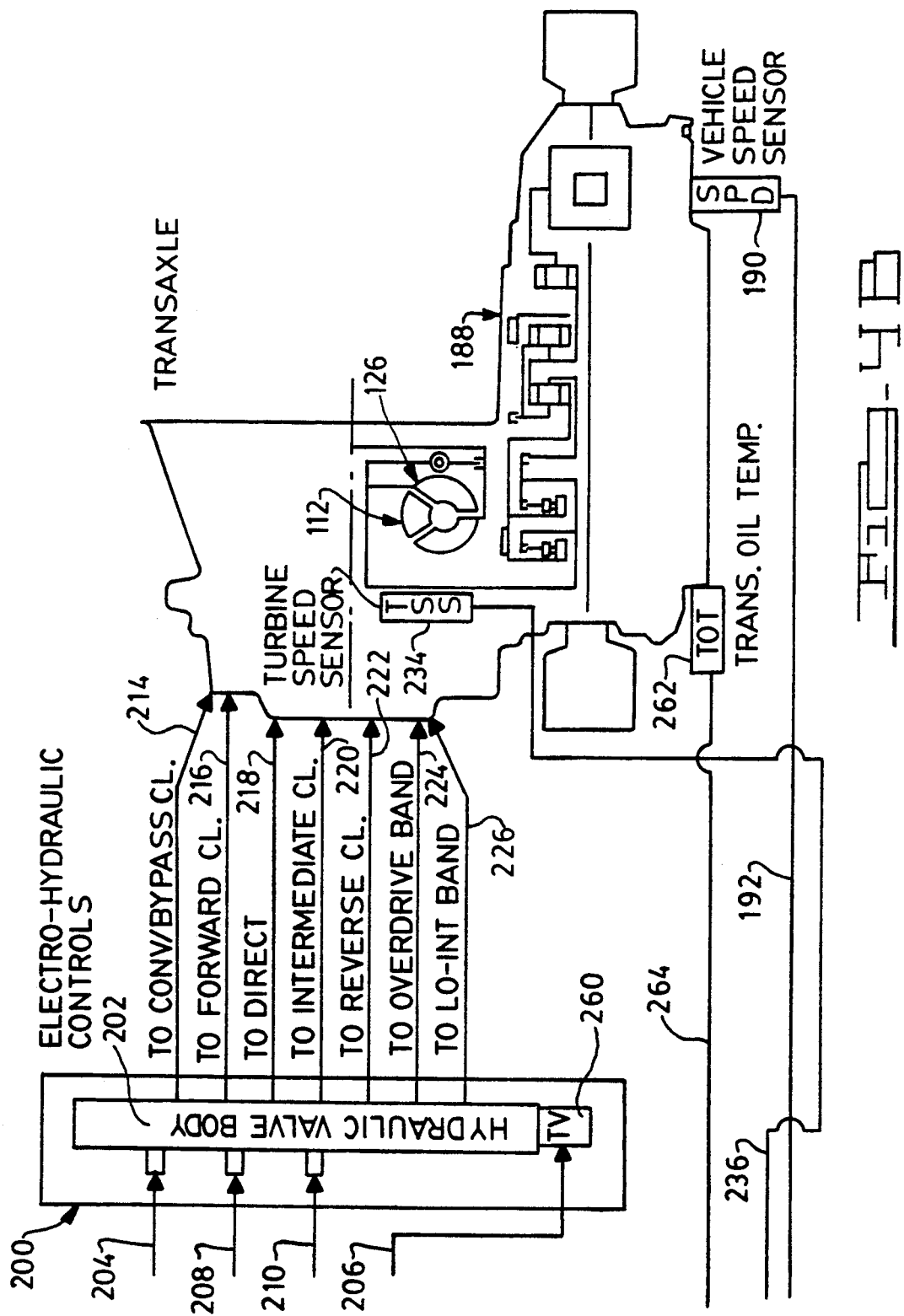

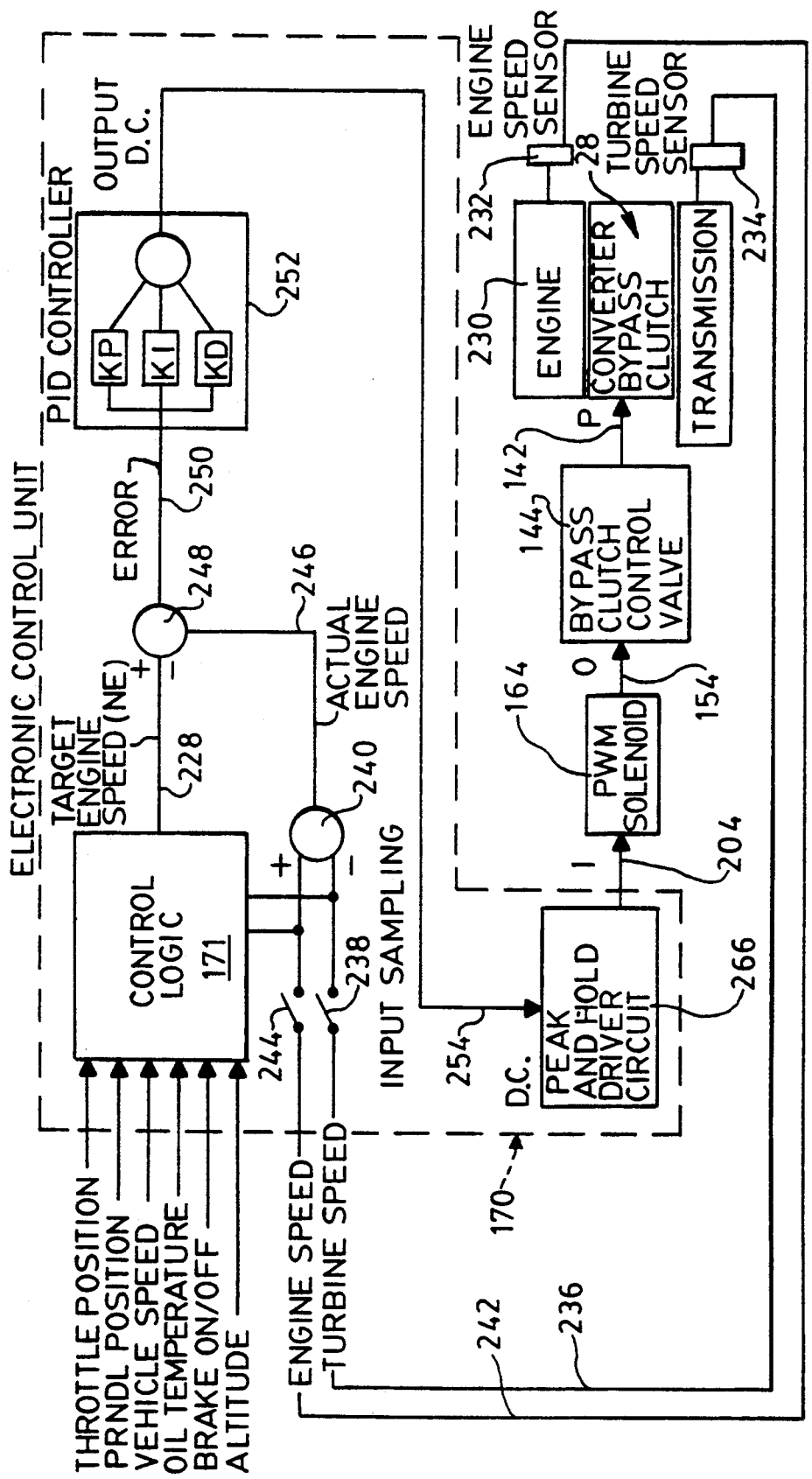

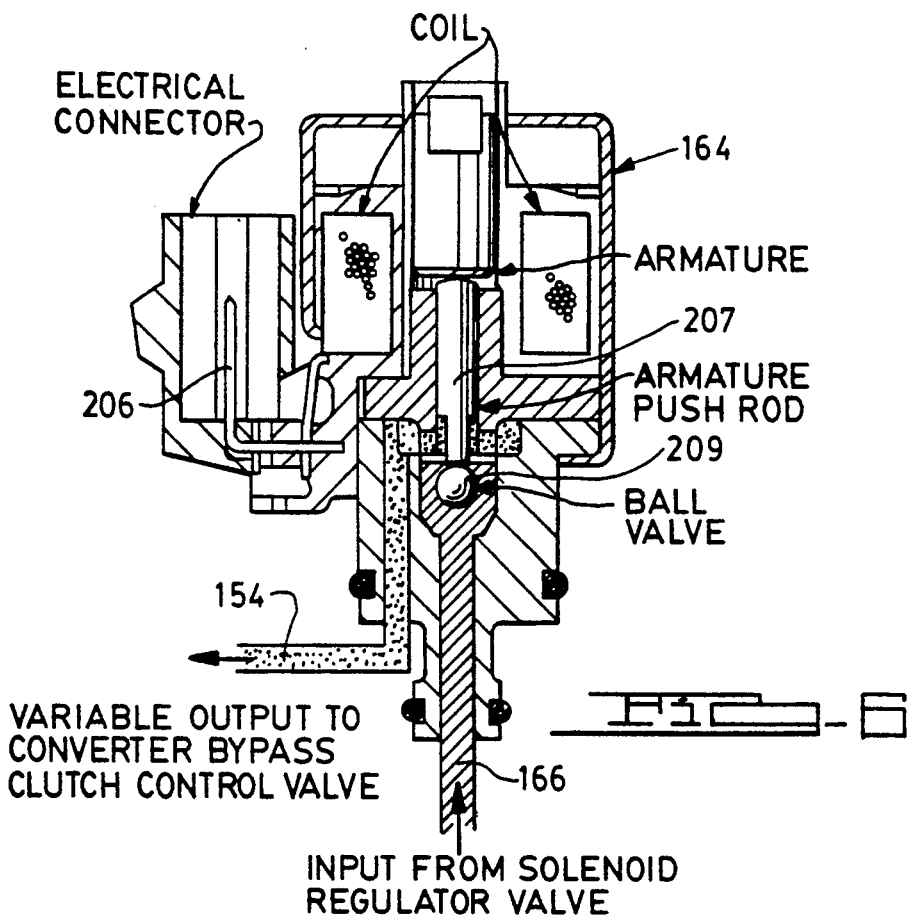
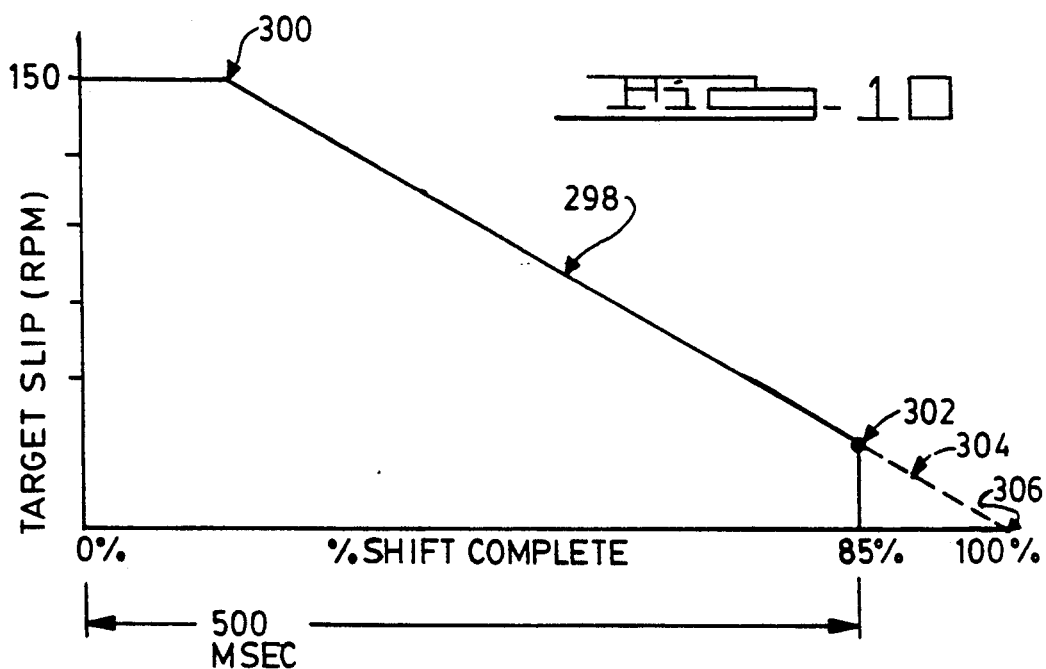

ELECTRONICALLY CONTROLLED BYPASS CLUTCH BASED ON PERCENT-SHIFT-COMPLETION FOR A TORQUE CONVERTER

TECHNICAL FIELD

This invention relates to automatic transmissions having a hydrokinetic torque converter with a bypass friction clutch and to an electronic controller for the bypass clutch.

BACKGROUND ART

The improvements of our invention may be applied to a hydrokinetic torque converter transmission of the kind disclosed, for example, in U.S. Pat. Nos. 4,978,328, 4,637,281, and 5,029,087, which are assigned to the assignee of this invention. Those references disclose a four-speed transaxle transmission for use in an automotive vehicle driveline. The transaxle has two simple planetary gear units arranged on a first axis transversely disposed with respect to the center plane of the vehicle and a torque transfer drive between torque output elements of multiple ratio gear units to each of two traction wheels through half shaft assemblies in a front wheel drive arrangement. The engine is mounted with its crankshaft arranged in spaced parallel relationship with respect to the axis of the planetary gearing. A hydrokinetic torque converter, mounted on the crankshaft axis, is connected by means of a chain drive to torque input elements mounted on the planetary gearing axis.

The torque converter of these prior art designs has a controllable bypass friction clutch that is engageable to establish a mechanical torque transfer between the crankshaft of the engine and the turbine of the converter, thus bypassing the hydrokinetic torque flow path.

The improvements of this invention can be applied also to a rear wheel drive transmission of the kind shown for example in U.S. Pat. No. 4,934,216. That transmission includes a hydrokinetic torque converter and multiple ratio gearing mounted on an axis that is common to the engine crankshaft axis. The torque converter of the design shown in the '216 patent also includes a friction bypass clutch.

It is desirable to control the capacity of the bypass clutch to effect a controlled slip in the clutch to compensate for torque transients and to eliminate noise vibration and harshness in the driveline. U.S. Pat. No. 5,029,087 describes one method for achieving a controlled slip in a bypass clutch. The clutch of that reference establishes a controlled slip condition by relying on engine speed and turbine speed signals. It continuously monitors the difference between the actual converter slip at any instant and a desired slip. That error is used to compute a duty cycle for a solenoid-operated pressure controller for the bypass clutch. The slip is controlled in this fashion until a final target slip is achieved. The target slip is a value stored in a microprocessor memory. Its magnitude depends upon throttle position and vehicle speed.

A microprocessor controller is used in a closed loop control circuit to establish partial clutch engagement rather than a full mechanical torque bypass through the clutch during a major portion of the operating time. The bypass clutch will permit the converter to operate near 100% mechanical efficiency when the driveline is operating in a steady-state mode.

The microprocessor responds to converter slip which is computed by sensing the turbine shaft speed and the engine speed and determining an error in the slip, the error being the difference between the actual slip and a desired slip. The desired slip depends upon information from a throttle position sensor, an engine speed sensor, a gear shift selector sensor, an oil temperature sensor, a vehicle speed sensor, and a transmission input shaft speed sensor.

In related copending patent application Ser. No. 922,627, filed Aug. 10, 1992, a modulated bypass clutch controller is described. That controller will achieve a controlled slip condition after the bypass clutch is commanded by the transmission control system to engage. After a steady-state condition is achieved, the controller will effect a so-called desired slip that will equal the target value. After the target value is reached and steady-state conditions continue, the desired slip may be reduced to zero or near zero to eliminator substantially eliminate slip in the hydrokinetic unit, thereby providing an added improvement in overall transmission operating efficiency. This also tends to improve durability of the clutch by providing more efficient torque energy management as friction heat is reduced.

Application Ser. No. 926,627, Aug. 10, 1992, was filed by A. L. Leonard, Kenneth, Walega and David Garrett, John Daubenmier, Bruce Palansky, Thomas Greene and Lawrence Buch, and is entitled "Automatic Transmission Control System". It is assigned to the assignee of the present invention. That application discloses a bypass clutch arrangement in a multiple ratio transmission wherein a close loop control of the bypass clutch capacity is effected by establishing a desired slip during steady-state operation following a command for clutch engagement. The desired slip is determined by setting it equal to the actual measured slip and then ramping the desired slip to achieve a progressively decreasing converter slip until a target value is reached. After steady-state operation is achieved and the desired slip is equal to target slip, the controller will cause a transition from the open loop slip control into a so-called "hard lock" mode in which the desired slip is again ramped to provide progressively decreasing actual slip until a zero slip or a near zero slip is effected. The near-zero slip condition is sometimes referred to as a "soft lock" mode.

The transmission disclosed in the copending application identified above does not include a turbine speed sensor, but it does include a vehicle speed sensor. It thus is necessary for purposes of carrying out the bypass clutch control strategy to compute, during each background control loop of the microprocessor, a turbine speed using a current vehicle speed value and a current gear ratio value for the transmission gearing.

The control strategy for the bypass clutch control disclosed in the copending application identified above makes provision for modulating the bypass clutch pressure during shift intervals. This is done to avoid undesirable torque transients during the shift. It is necessary in the design of the copending application to continuously monitor calculated speed ratio across the converter. When a predetermined delta speed ratio, or speed ratio difference, is detected, that is an indication of the beginning of a shift following the command of a shift by the control system processor. Pressure modulation occurs, following the detection of the beginning of the shift, through the shift interval and is ended when the processor detects that the so-called delta speed ratio is sufficiently high to indicate that the shift actually has come close to completion. The processor then will return to the close loop control, and that in turn is followed by the so-called hard lock mode or soft lock mode described above.

The clutch control of the present invention has features that are common to the controller and the control strategy described in the copending application. Those common features relate in general to the behavior of the bypass clutch following a command for clutch engagement and prior to a command for a change in speed ratio. Those common features relate also to the behavior of the clutch after the completion of a shift interval. The transmission of the present invention includes a turbine speed sensor, and in this respect it differs from the transmission described in the copending application. Thus, the behavior of the clutch and the control strategy for effecting control of the clutch during the shift interval differs from that described in the copending application.

BRIEF DESCRIPTION OF THE INVENTION

The clutch controller of the present invention functions to enable and to disable the clutch and to allow continuous modulation of the clutch during definable regions of the clutch operating schedule. It controls transitions between the open loop, initial engagement mode, the soft lock mode, the shift interval operating mode and the hard lock mode.

Our improved control system is capable of controlling the clutch, particularly during shifting, to provide improved durability and improved energy management throughout the entire operating range of the clutch. It does this by controlling torque transients during application and release of the clutch, particularly during shifts. The torque management during a shift is achieved as a function of the percent of shift completion following the command of the shift so that the duty cycle of the solenoid-operated clutch pressure control can be varied as a function of the percent of shift completion following the command of shift and by providing a unique set of algorithms for controlling the clutch as a function of the progression of the shift between the modulation mode, the hard-lock mode and the shift-lock mode.

BRIEF DESCRIPTION OF THE DRAWINGS

FIG. 1 shows in schematic form a multiple ratio transaxle having a hydrokinetic torque converter in an automotive vehicle driveline wherein the torque converter has a bypass clutch that is controlled by the processor and control strategy of the present invention;

FIGS. 4A and 4B in schematic form the control elements of the bypass clutch control including the microprocessor, the hydraulic valve body and the planetary gearing together with the various sensors that develop signals that are used by the processor to establish shift points in the transmission itself as well as signals for the converter bypass control;

FIG. 5 shows the proportional-integral-derivative close loop control system for the bypass clutch schematically illustrated in FIG. 3;

FIG. 6 is a schematic cross-section representation of a solenoid regulator valve for establishing a controlled bypass clutch pressure;

FIG. 10 is a chart showing the relationship between the percent of shift completion and the target slip, which is a relationship that is calibrated by the calibrator for the transmission control system and stored in the memory of the processor;

PARTICULAR DESCRIPTION OF THE INVENTION

Figure 2:
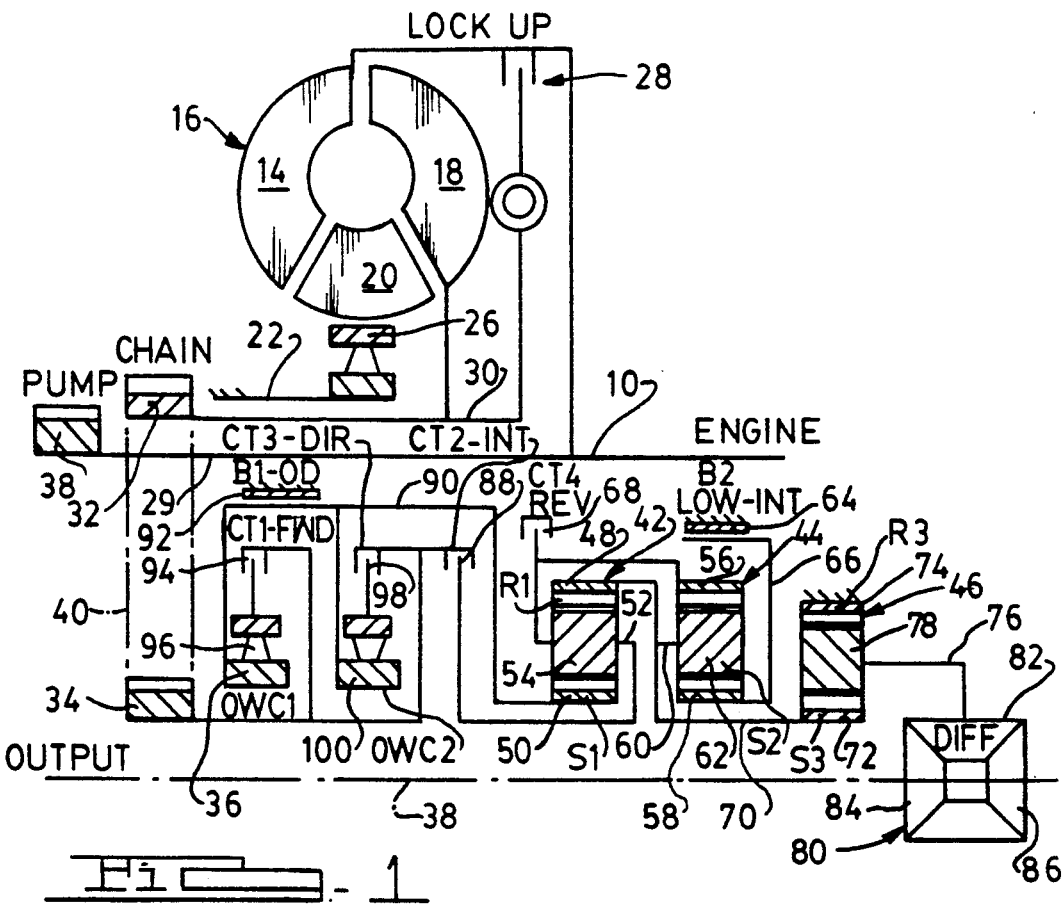
FIG. 2 is a chart that shows the clutch and the brake engagement and release pattern for the transmission schematically illustrated in FIG. 1.

In FIG. 1, numeral 10 designates the crankshaft of an internal combustion engine. Crankshaft 10 is connected to the impeller 14 of a hydrokinetic torque converter 16. The converter 16 includes also a bladed turbine 18 and a bladed stator 20, the latter being located between the torus flow outlet section of the turbine 18 and the torus flow inlet section of the impeller 14. The stator 20 is supported by a stationary sleeve shaft 22 connected to the transmission housing shown at 24 in FIG. 3. An overrunning brake 26 is situated between the bladed section of the stator 20 and the stationary sleeve shaft 22. Overrunning brake 26 permits freewheeling motion of the stator 20 in the direction of rotation of the impeller, but it prevents rotation in the opposite direction.

A torque converter lockup clutch 28 is adapted to establish a driving connection between the impeller 14 and turbine shaft 30 (FIG. 3), the latter being connected to the bladed impeller 18. For a complete description of the mode of operation of the clutch 28, reference may be made to the previously identified patents.

The engine crankshaft 10 is connected to a pump driveshaft 29, which drives a variable displacement pump 38 for the automatic transmission control system. Turbine shaft 30 (FIG. 3), which is a sleeve shaft surrounding driveshaft 29, serves as a torque input shaft for a drive sprocket 32. A driven sprocket 34 is connected to torque input shaft 36 for multiple ratio gearing disposed about the output shaft axis 38. Axis 38 is parallel and laterally offset with respect to the engine crankshaft. Drive chain 40 serves as a torque transfer member that connects drivably the drive sprocket 32 with the driven sprocket 34.

The multiple ratio gearing comprises a pair of simple planetary gear units 42 and 44 as well as a final drive planetary gear unit 46. Gear unit 42 includes ring gear 48, sun gear 50, a planetary carrier 52 and multiple planet pinions 54 which are journalled on carrier 52 so that they mesh with ring gear 48 and sun gear 50.

Carrier 52 is connected directly to ring gear 56 of the planetary gear unit 44. Gear unit 44 includes also sun gear 58, planetary carrier 60 and planet pinions 62 journalled on carrier 60 so that they mesh with ring gear 56 and sun gear 58.

Sun gear 58 is adapted to be braked by a low and intermediate brake band 64 which surrounds brake drum 66 connected to the sun gear 58. The low and intermediate brake 64 carries the notation $B_2$ in FIG. 1 as well as in the chart of FIG. 2.

A reverse brake 68 selectively brakes the ring gear 56 and the carrier 52 which are connected together as explained. Brake 68 in FIG. 1 carries the notation $CL_4$ in FIG. 1 as well as in the chart of FIG. 2.

Carrier 60 is connected to torque output shaft 70 for the planetary gearing. Shaft 70 is connected to sun gear 72 of the final drive planetary gear unit 46. Gear unit 46 includes also ring gear 74 which is held stationary by the transmission housing. Gear unit 46 includes also carrier 76 which journals pinions 78 that mesh with ring gear 74 and sun gear 72. Carrier 76 is connected to the differential carrier of a differential gear unit 80. The differential carrier has pinions 82 journalled thereon, and these are connected drivably to the carriers 76.

Differential gear unit 80 includes also side gears 84 and 86. Each side gear is connected to a separate torque output half-driveshaft, the outboard ends of the driveshafts being connected to the vehicle traction wheels. A universal joint, not shown, connects one end of each half shaft with its associated side gear and the outboard end of that half shaft is connected to its associated traction wheel by a second universal joint, not shown.

The input sleeve shaft 36 is connected to the carrier 52 of gear unit 42 through an intermediate speed ratio clutch 88. That clutch is identified by the symbol $CL_2$ in FIG. 1 as well as in the chart of FIG. 2. Sun gear 50 of the gear unit 42 is connected to brake drum 90 about which is positioned overdrive brake band 92. Brake band 92 is identified by the symbol $B_1$ in FIG. 1 as well as in the chart of FIG. 2. Sun gear 50 and brake drum 90 to which it is connected is connected to input shaft 36 through forward clutch 94 and overrunning clutch 96 situated in series relationship. Clutch 94 is identified by the symbol $CL_1$ in FIG. 1 as well as in the chart of FIG. 2. The overrunning clutch 96 is identified by the symbol $OWC_1$ in FIG. 1 as well as in the chart of FIG. 2.

A direct drive clutch 98 and a second overrunning clutch 100, which are arranged in series relationship, connect input shaft 36 with the brake drum 90 and the sun gear 50. The symbol $CL_3$ identifies the direct drive clutch in FIG. 1 as well as in the chart of FIG. 2. A second overrunning clutch is identified by the symbol $OWC_2$ in FIG. 1 as well as in the chart of FIG. 2.

By engaging selectively the clutches and the brakes, four forward driving speed ratios can be achieved as well as a single reverse speed ratio. The forward clutch 94 is engaged during operation in the first three forward driving ratios and the intermediate clutch 88 is engaged in the second, third and fourth forward driving ratios. Direct drive clutch 98 is engaged during operation in the third and fourth forward driving ratios as well as the reverse driving ratio. It is engaged also during manual low operation to effect a bypass around the overrunning clutch 100 during engine braking.

Sun gear 50 acts as a reaction member during overdrive operation. It is braked by overdrive brake band 92 which is applied during fourth ratio operation. Low and intermediate brake band 64 is applied during operation in low and intermediate operation.

In the chart of FIG. 2, the clutch engagement and release pattern is indicated. A symbol "X" is used to define an engaged clutch or brake. The symbol O/R is used to indicate an overrunning condition for the appropriate overrunning clutch.

Figure 3:
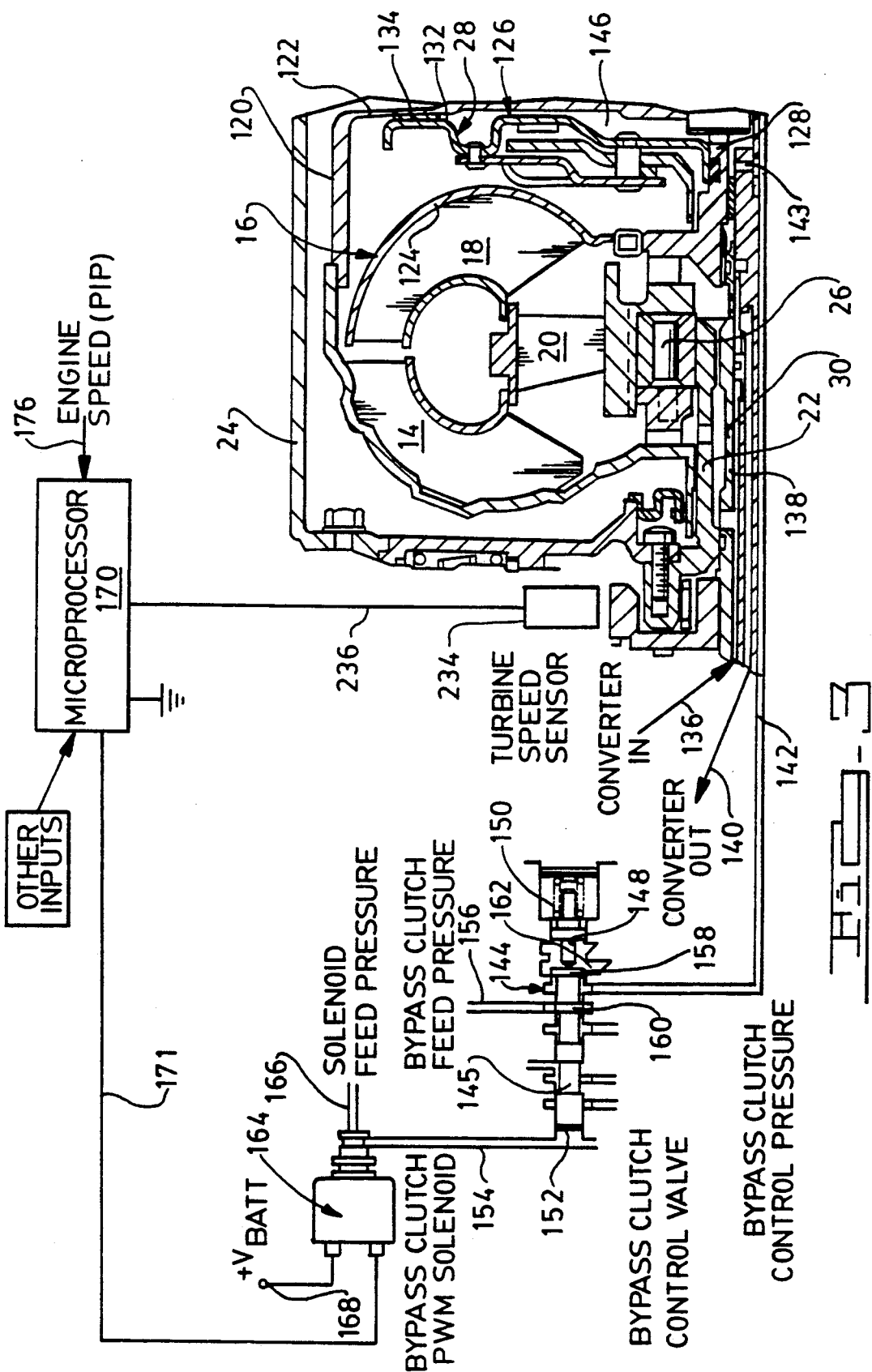
FIG. 3 is a schematic representation of the bypass clutch control valve circuit which includes a turbine speed sensor, a microprocessor, a bypass clutch solenoid valve, a bypass clutch control valve and the fluid circuits between the bypass clutch control valve and the bypass clutch for the converter.

As shown in FIG. 3, a cavity within the impeller housing 120 is formed between the shroud 124 of the turbine and the end wall 122. A clutch plate and damper assembly 126 is disposed in that cavity.

Assembly 126 is splined to turbine hub 128, which in turn is splined to turbine sleeve shaft 30 extending through the hub of stator 20 and the hub of impeller 14.

When the clutch plate 132 is pressurized by the pressure in the torus circuit, the friction surface 134 on the radially outward margin of the pressure plate engages the impeller shell thereby establishing a mechanical torque flow path between the impeller and the turbine, the former being connected to the crankshaft of an internal combustion engine. Pressure is distributed to the torus circuit through a flow passage that is defined in part by ports formed in stationary stator sleeve shaft 138 that surrounds the turbine sleeve shaft 30. A similar flow path defined by the sleeve shaft arrangement for the converter is provided for accommodating the flow of converter fluid from the torus circuit, the flow path being shown schematically at 140 in FIG. 3.

The sleeve shaft arrangement defines also a central converter bypass clutch control pressure passage 142 which communicates through a radial port 143 in the turbine shaft 30 with clutch control chamber 146 formed between the clutch plate and damper assembly 126 and the adjacent wall 122 of the impeller housing 120.

Control pressure passage 142 communicates with a bypass clutch control valve 144 which comprises a multiple land valve spool 145 and an aligned valve plunger 148. Valve spring 150 urges the plunger 148 and the multiple land valve spool 145 in a left hand direction. That spring force is opposed by a pressure force acting on the end of land 152 of multiple land valve spool 145. Pressure is distributed to the valve chamber on the left side of the land 152 through a bypass clutch solenoid pressure passage 154. As seen in FIG. 6, the solenoid windings will actuate an armature push rod 207, which controls the seating force of ball valve 209. That in turn controls the pressure in passage 154.

A bypass clutch feed pressure passage 156 communicates with control valve 144 at a location intermediate valve lands 158 and 160, the latter being smaller than the former so that a feedback pressure force opposes the force of the spring 150. Bypass clutch control pressure passage 142 communicates with the valve 144 at a location intermediate lands 158 and 160. Land 158 controls the degree of communication between passage 156 and exhaust port 162.

A pulse width modulated solenoid actuator and valve assembly is shown at 164 in FIGS. 3 and 6. Solenoid feed pressure is distributed to the actuator and valve assembly 164 through a feed passage 166.

Figure 4A:
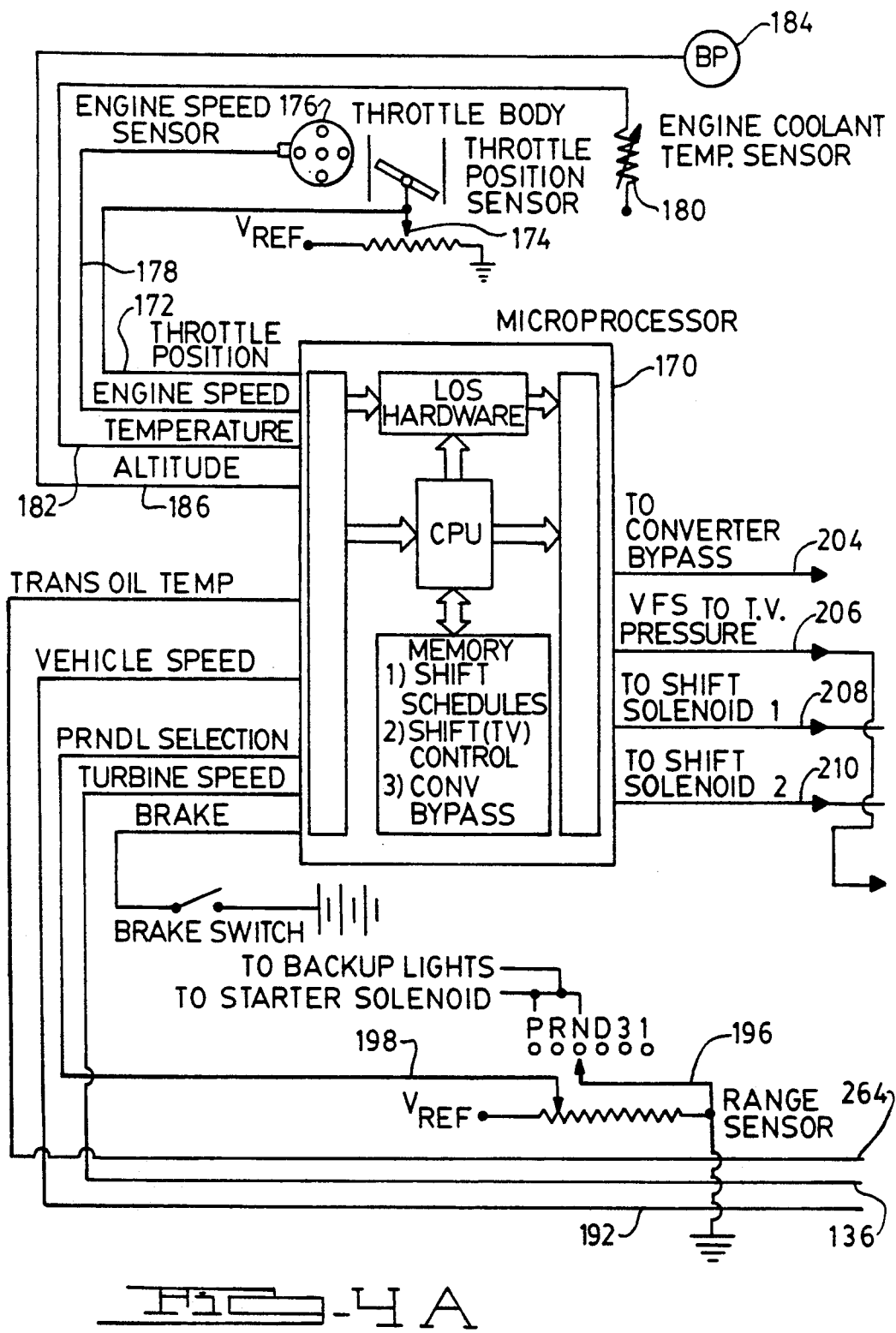

The solenoid valve driver is powered by battery 168. An electronic microprocessor, which will be described with reference to FIGS. 4A and 4B, is shown in FIGS. 3 at 170. As will be described subsequently, the processor 170 receives input signals from various sensors which measure engine and vehicle operating conditions. The output of the microprocessor is transferred through lead 171 to the bypass clutch pulse width modulated solenoid 164. The solenoid valve controlled by the pulse width modulated solenoid modulates the pressure in the solenoid feed pressure passage 166 and delivers a control signal through line 154 to the bypass clutch control valve. The clutch control valve is calibrated to receive the control pressure of the solenoid output to establish in line 142 and in control chamber 146 a pressure that will determine the controlled slip of the clutch.

FIG. 4A shows in schematic form the architecture of the processor 170 as well as the relationship of the processor to the hydraulic control valve body and to the transmission clutches and brakes. FIG. 4A shows the schematic arrangement of the various sensors with respect to the processor and the hydraulic control valve body.

The sensors, together with transducers not specifically illustrated in FIG. 4A, convert physical signals to electrical signals. Physical signals include throttle position or engine manifold pressure, engine speed and transmission gear ratio selection as well as other variables such as engine temperature and the vehicle brake condition. The processor inputs these signals and operates on them according to a control program or a strategy and then outputs the results to actuators which function in cooperation with the hydraulic valve body to control the transmission. Processor 170 includes the central processing unit or CPU which comprises a computation unit and a control unit. An internal control bus establishes a relationship between a memory unit and the processing unit. Other internal buses establish a relationship between the CPU and the input conditioning signal circuit and the output driver circuit.

The CPU executes programs that are fetched from memory and provide the timing and controlled values of the output signals to the hydraulic control valve body of the transmission. The input signal conditioning and the output driver system allow the microprocessor to read the input data from the microprocessor under the program control.

The memory portion of the processor 170 stores programs and data and provides data to the processor as well as accepting new data from the processor for storage.

The memory portion of the processor 170 of FIG. 4A includes two types of memory; first, a read only memory or ROM which stores information or data that is read by the processor in each background loop and, second, a random access memory or RAM which holds or temporarily stores the results of the computations of the CPU as well as other data. The contents of the RAM can be erased, rewritten or changed depending upon the operating conditions of the vehicle.

The two types of memory are stored in an integrated circuit in the form of a microprocessor chip whereas the computations performed by the CPU are the result of the function of a second integrated circuit comprising a separate microprocessor chip, the two chips being connected by an internal bus and interface circuitry.

One of the input signals to the processor 170 is a throttle position signal in line 172 which is received by a position sensor 174. An engine speed sensor 176 in the form of a profile and ignition pickup (PIP) delivers an engine speed signal through line 178 to the processor 170. An engine coolant sensor 180 delivers an engine temperature signal through line 182 to the processor 170. A barometric pressure sensor 184 delivers an altitude signal through line 186 to the processor 170.

A vehicle speed sensor 190 measures or senses the speed of the driven element of the transmission which is an indicator of the vehicle speed. That signal is delivered through line 192 to the processor 170.

The drive range for the transmission is selected by the vehicle operator by manual adjustment of an adjustment lever schematically shown at 196. The various ranges are reverse, neutral, drive (D), direct drive ratio (3) and low speed ratio (1). Various shift patterns are established for the three forward drive ranges D, 3, and 1, depending upon the position that is selected by the vehicle operator. The position that is selected is sensed by the sensor and a position signal delivered through line 198 to the microprocessor 170.

The microprocessor 170 includes also a subsystem identified as loss-of-signal-hardware (LOS). This hardware is adapted to establish an appropriate control signal for the output driver circuit that will cause the hydraulic valve body to continue operating with limited function in the event of an electronic voltage failure in the system.

The electrohydraulic control valves, identified in FIG. 4B generally by reference character 200, include a valve body 202. The output signals of the processor 170 are delivered to the control valve body through a plurality of leads as shown at 204 through 210. Lead 204 (FIG. 5) carries a converter bypass signal which communicates with the PWM solenoid 164, which communicates with valve 144. Valve 144 communicates with passage 142 and chamber 146 as seen in FIG. 3. Lead 206 (FIG. 6) carries a control signal for a variable force solenoid pressure control. That signal depends upon throttle position, vehicle speed, torque, oil temperature and altitude. Leads 208 and 210 carry shift solenoid pressure signals for effecting ratio changes in the transmission.

The output signals of the electrohydraulic controls 200 are distributed to the transaxle through control lines 216 through 226. Line 214 corresponds to control passage 142 shown in FIG. 1. It extends to the converter bypass clutch control chamber. Lines 216, 218, 220 and 222 extends, respectively, to the forward clutch, the direct clutch, the intermediate clutch and the reverse clutch for the transaxle. Lines 224 and 226 extend, respectively, to the overdrive brake band and to the lower and intermediate brake band for the transaxle.

The control system block diagram of FIG. 5 illustrates the overall system that is used to establish a so called clutch engage mode. The different operating modes, including the engage mode, will be described subsequently.

As seen in FIG. 5, the control logic 171 is embodied in the control module or CPU of the processor 170. The various signals that are received by the processor 170 are illustrated. These correspond to those described with reference to FIG. 4A. As will be explained subsequently, the control logic 171 of the processor 170 calculates a target slip, or between actual engine speed and target engine speed and that value is represented by a signal in line 228. The control software and electronics of FIG. 5 are incorporated into the control system.

For the purposes of this specification, the software for the electronic control unit 170, exclusive of the peak-and-hold driver circuit 156, will be described in terms of hardware functions schematically illustrated in FIG. 5.

The system is effective to establish in the bypass clutch sufficient capacity to hold the desired slip at the current torque. Torque transients then are absorbed by momentary periods of increased slip as the controller establishes a new output signal for the solenoid corresponding to the new torque condition.

Numeral 230 designates the internal combustion engine, and numeral 232 designates an engine speed sensor which measures crankshaft speed. The transaxle or transmission has a turbine speed sensor 234. The output signal of the turbine speed sensor 234 is sampled via signal flow control path 236 and input sampling switch 238 to the control logic 171 of the processor 170. The turbine speed signal is sampled also by a comparator register 240.

Engine speed measured by the sensor 232 is sampled via signal flow path 242 and input sampling switch 244 by the control logic of processor 170. The signal is sampled also by the comparator register 240.

The comparison at the register 240 determines whether there is any difference between the turbine speed and the engine speed. This value is called actual slip, and the value of that actual slip is represented by a signal in lead 246 which is distributed to summing point 248. The difference between the value of the signal in lead 246 and the target signal in lead 228 is measured at summing point 248 to establish and error signal in line 250. This error signal is distributed to a proportional-integral-derivative controller logic portion of the processor 170. PID controller is shown at 252. This controller may be of a well known variety. It is inserted into the control loop to form a part of the forward gain of the control system. It effects proportional control, an integral control and a differential control. By adjusting the magnitude of these terms, the actual signal that is the output of the PID controller can be modified so as to produce the required system response.

The proportional control feature of the PID controller makes it possible for the output of the controller to be varied directly with the error signal. It produces a so called gain factor, which is a measure of the control gain in the system that reduces accordingly the magnitude of any current errors. Because the proportional control by itself, of necessity, establishes a gain factor of limited range, it is not sufficient to achieve the desired response due to steady state errors or undesired slip oscillations. The integral control component of the PID controller eliminates steady state error for improved system accuracy. The response can further be improved to effect system stability and effective transient response of the system by introducing the derivative control. This introduces a stabilizing effect on the system because of the addition of phase lead to the control loop.

The output of the PID controller is a duty cycle signal that follows signal path 254. This is received by a peak-and-hold driver circuit 266 for the pulse width modulated solenoid 164, the latter being connected to the driver circuit 266 through line 204.

Although we have described in this specification a PWM solenoid, it is contemplated that the system could be adapted to use instead a variable force solenoid (VFS).

Figure 13:
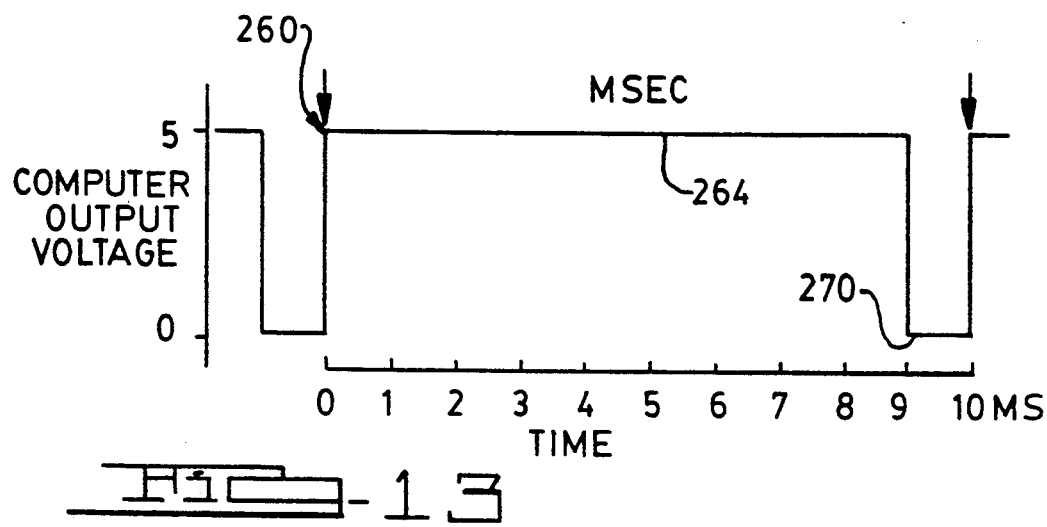
FIGS. 12 and 13 show the relationship of solenoid current and computer voltage output for the solenoid with respect to time.
Figure 12:
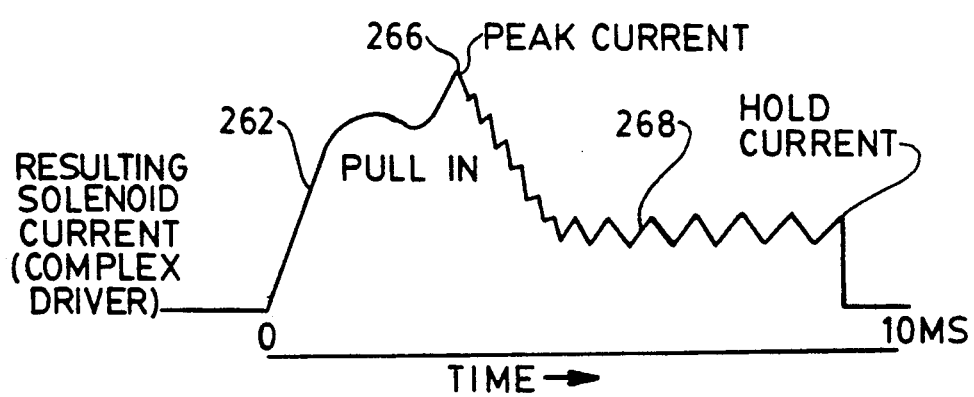

The peak-and-hold circuit for the PWM solenoid may be of a conventional type. It is effective to establish at the input side of the solenoid a driver voltage similar to that shown in FIG. 12 upon receipt of a signal from the PID controller. As shown in FIG. 13 at 260, the peak- and-hold circuit establishes a change in the solenoid input represented by the steep slope portion 262 of the curve in FIG. 12. During the initial part of the hold time during which the controller output voltage is established at a value shown at 264, a peak current is established by the driver as shown at 266. This overcomes the initial friction and inertia of the solenoid (pull-in). That event is followed by a moderate hold current value as shown at 264 until the termination of the duty cycle on-time at 270. The cycle is repeated again in the next duty cycle period.

The output of the solenoid valve 258, which would correspond to the solenoid valve 164 of FIG. 3, is distributed to the bypass clutch control valve 144 described with reference to FIG. 3. The output of the bypass clutch control valve is a pressure signal in passage 142 which, as explained with reference to FIG. 3, communicates with control pressure chamber 146 for the converter bypass clutch 126.

The hydraulic valve body 202 includes a throttle valve assembly as described in the references identified in the background art discussion. The throttle valve assembly establishes a pressure signal as an indicator of engine torque and other variables as explained above. The throttle valve is identified by reference numeral 260 in FIG. 4B. The output of the throttle valve assembly supplies the desired pressure to the valve body 202. A transmission oil temperature sensor shown at 262 distributes a signal through line 264 to the input signal conditioning portion of the microprocessor 170, as shown in FIG. 4A.

Figure 7:
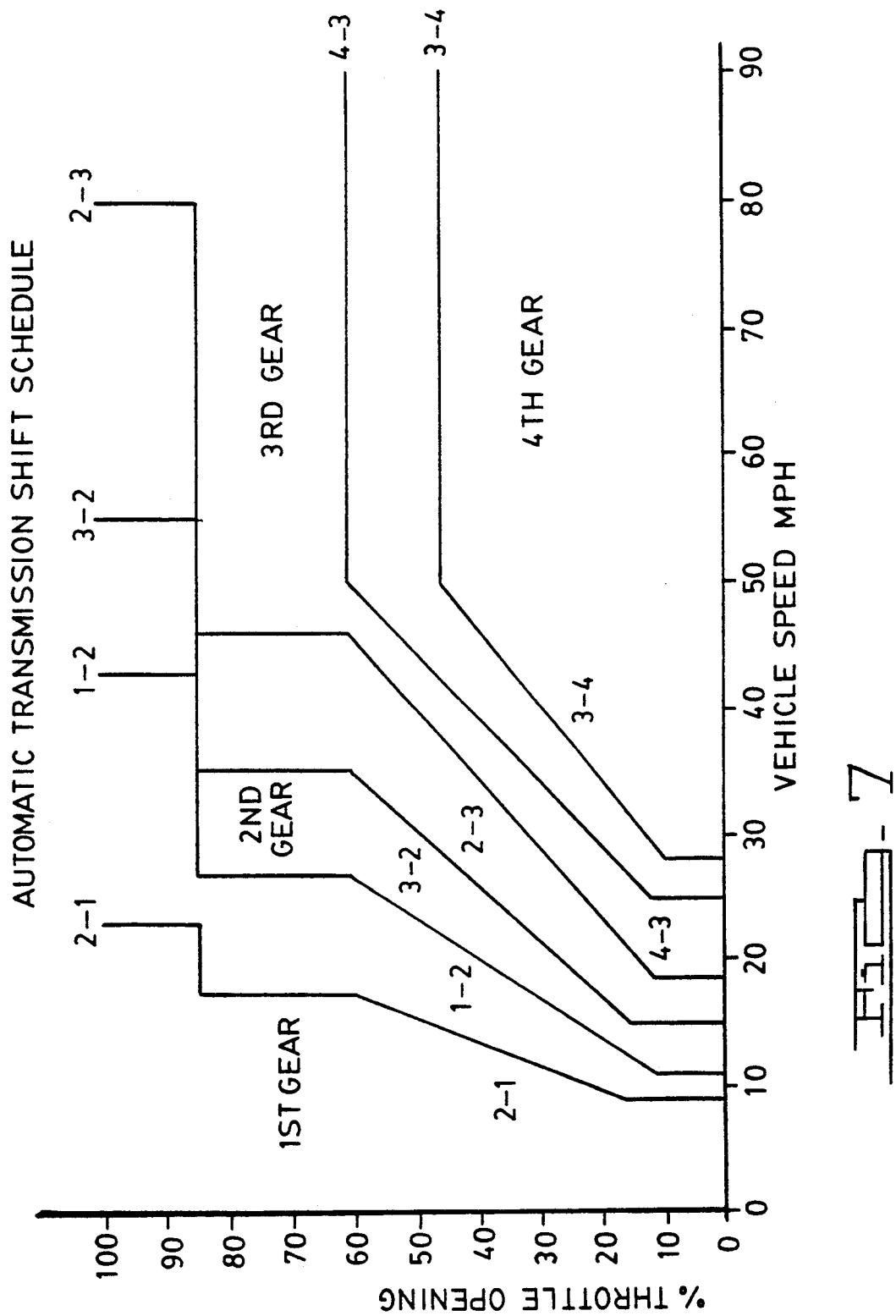
FIG. 7 is a chart that shows the shift points for the transmission as a function of vehicle speed and throttle opening, each shift having an independent shift point curve.

FIG. 7 shows the shift schedule information that is stored in the ROM portion of the memory for the microprocessor 170. As indicated, for every vehicle speed, there is a throttle opening at which a ratio change will occur. Each ratio change, regardless of whether it is an upshift or a downshift, has its own shift point schedule as indicated in FIG. 7. For example, for a 60° throttle opening, a 2-1 downshift will occur at approximately 15 miles per hour and a 1-2 upshift will occur at approximately 22 miles per hour. Microprocessor 170 will initiate the shift command signals in response to the information provided by the input sensors. It initiates also the lockup clutch engagement and release signals.

The behavior of the lockup clutch during a shift interval now will be described with reference to FIGS. 8, 9, 10 and 11.

Figure 9:
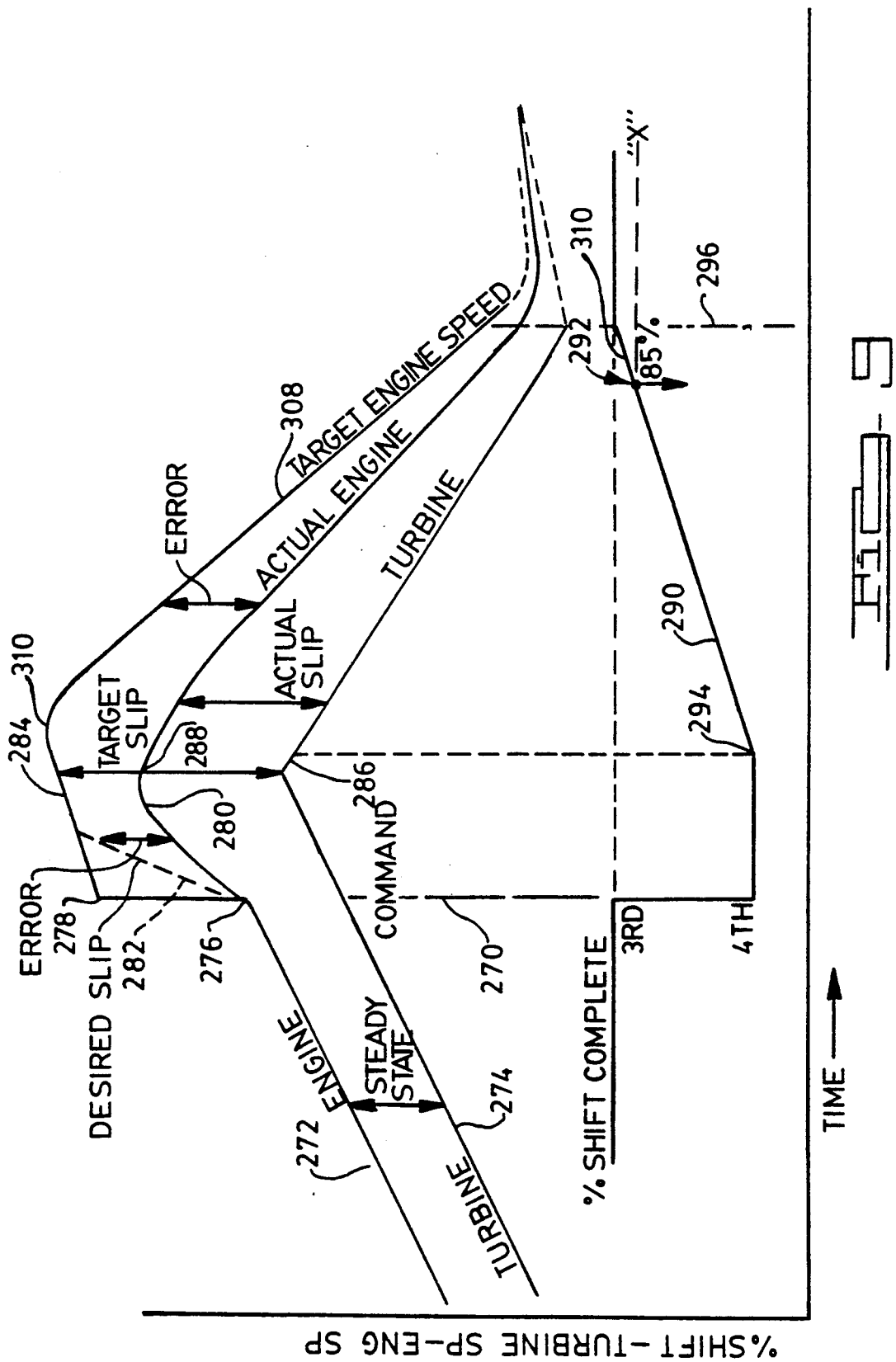
FIG. 9 is a chart that shows the time-based relationship between turbine speed, engine speed and the calibration constant "percent shift complete" during a shift interval following the command of a shift.

Shown in FIG. 9 is the relationship between time, plotted on the abscissa, and engine turbine speed and a dimensionless characteristic identified as percent shift complete plotted on the ordinate. This relationship of FIG. 9 occurs following a shift command and continues to the time that the shift is complete. Prior to the initiation of the shift command, the characteristics of the converter are determined by the PID controller described with reference to FIG. 5. This PID control is similar to the PID control during steady state operation described in the previously identified copending patent application.

As indicated in FIG. 9, the processor will command a shift at a time shown at 270 in FIG. 9. When the clutch is in steady state operation, before a command for the shift is made at 270, the engine speed shown at 272 and the turbine speed shown at 274 are generally parallel, which indicates that the target slip has been achieved. The magnitude of the slip indicated as a steady state slip in FIG. 9 is the difference at any time between the engine speed, sensed by the processor, and the turbine speed sensed by the processor. The turbine speed and the engine speed are measured once each background loop as time progresses on the horizontal axis.

As indicated in the copending patent application identified above, the desired slip is set equal to the actual slip at the time that engagement of the bypass clutch is commanded. The desired slip then is decayed or ramped downwardly toward a target value at a rate that is calibrated uniquely for each gear ratio. The desired slip is calculated during each background loop. The decayed or ramped desired slip value is compared to the actual slip to detect an error. Duty cycle for the bypass clutch solenoid control valve is determined so that the actual slip decays toward a target value until it reaches the target slip. This control of the clutch during the steady state operating mode will be referred to hereafter as the PID control mode.

As mentioned earlier, a shift occurs at time 270, shown in FIG. 9, for the controller for the present invention. At time 270, an upshift, for example, is commanded to occur between a third ratio and a fourth ratio. A calibration constant, which is a dimensionless value PCUPSCMPT, is plotted in FIG. 9. The various constants, one for each shift, are between the value 0 and the value 1, as indicated. The constant that is retrieved by the controller will be dependent upon the shift being executed. Immediately the target engine speed then will change from a value at 276 to a value at 278.

The actual engine speed, which is plotted as shown at 280, begins to rise. The desired slip, as shown by the dotted line 282, is not allowed by the processor to proceed immediately to the slip value corresponding to the target engine speed 278 because that would exceed the control capacity of the processor. Instead a maximum rate is fetched from the ROM register where a maximum rate for the 3-4 upshift is stored, and that rate value is multiplied by the engine speed value at 276 to produce the slope indicated by the desired slip line 282. Finally, the desired slip line will blend with the target engine speed line as indicated at 284.

As the routine continues following the command of the shift, the error between the engine speed line 280 and the desired slip line is continuously monitored. That error is used to calculate a duty cycle for the bypass clutch solenoid control valve in a manner described in previously mentioned U.S. Pat. No. 5,029,087 as well as in the copending patent application identified above.

At 286, the turbine speed, which is continuously monitored by the turbine speed sensor, begins to slope downward as does the engine speed after the engine speed reaches a peak as shown at 288. At the time the turbine speed begins to ramp downward, the percent complete that is calibrated and stored in RAM begins to rise as indicated at 290. That percent complete value is constantly being computed by the microprocessor. One computation is carried out each background loop. The microprocessor determines the value for percent shift complete using the equation:

TRANSMISSION RATIO MINUS OLD GEAR RATIO/GEAR RATIO CORRESPONDING TO A COMPLETED 3-4 UPSHIFT MINUS THE GEAR RATIO FOR THE BEGINNING OF THE UPSHIFT, NAMELY, THIRD RATIO.

The transmission ratio is equal to the turbine speed divided by the output shaft speed. The gear ratio at the beginning of the upshift is a calibration parameter fetched from memory and the gear ratio at the end of the upshift also is a calibration parameter stored in memory. In this equation, the turbine speed is the only variable, assuming the vehicle speed during the shift interval does not change or changes only a negligible amount. The others terms are calibration constants. Thus, as the turbine speed changes, as indicated in the graph of FIG. 9, the percent shift complete value begins to rise as shown at 290.

At a percent shift complete value of about 85%, which is a value "x" (see FIG. 9) chosen by the transmission calibrator, the shift is considered to have been completed. That percentage is indicated at 292 in FIG. 9. Between the point 294 and the point at 292 where the shift is considered to have been completed, the turbine speed falls and the actual slip is continuously monitored. The error is the difference between the actual engine speed and the target engine speed value. At a time later than the time indicated at 296, the actual engine speed is for all practical purposes equal to the target engine speed.

A target engine speed is determined using the function illustrated graphically in FIG. 10 where the percent shift complete value is plotted on the horizontal axis and the target slip value, measured in rpm, is plotted on the vertical axis. The relationship is indicated by the sloped line 298. Point 300 corresponds to point 294 in FIG. 9 where the percent shift complete value begins to change. Beginning at point 300 in FIG. 10, the target slip value decreases until point 302 is reached, at which time the shift is approximately 85% complete.

As will be explained subsequently, the target slip value will continue to be determined as shown at 304 from the shift control function of FIG. 10 until a post-shift timer expires or until a zero target slip is reached at the 100% complete shift point 306.

The curve representing target engine speed increases as shown at 284 and then slopes downwardly as duty cycle changes along a negative slope line 308 after having reached a peak at 310. This line represents the engine speed that is needed in order to achieve the target slip value shown at 298 in FIG. 10. As previously mentioned, this line is a calibrated function stored in memory.

After the percent complete value corresponding to 85% shift completion is reached, the routine will continue at a post shift control phase causing continued clutch control until the post-shift timer expires. At that time the percent shift complete value changes along line 310 in FIG. 9. A transition then may be made to the so-called hard lock mode as described in the copending application identified above.

Figure 8:
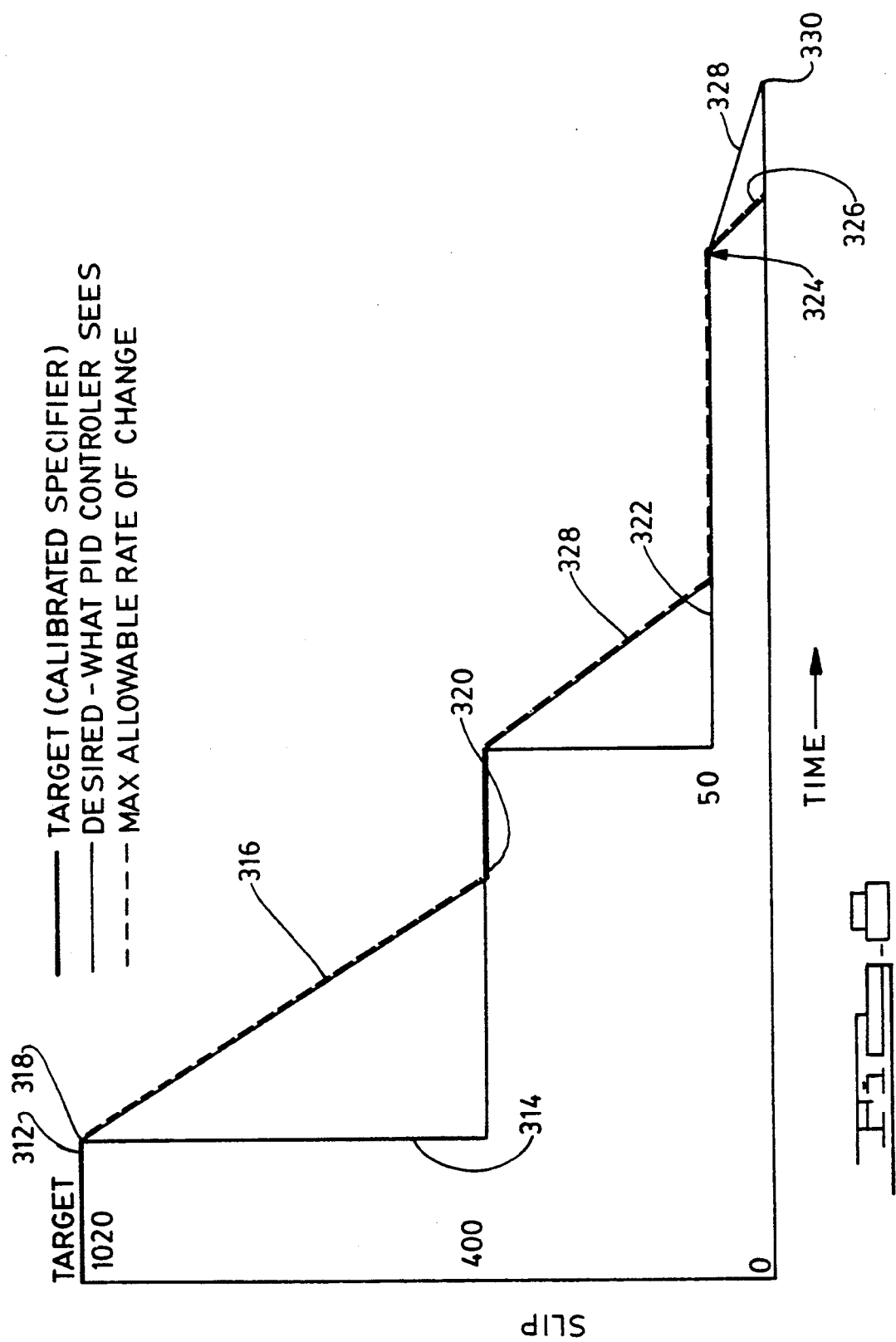
FIG. 8 shows the relationship between the target slip and desired slip values for the present transmission as a function of time measured on the horizontal axis.

Shown in FIG. 8 is a plot of time versus slip, which indicates a stepped value for the target slip. A calibration constant will determine the target slip value during steady-state operation as shown at 312 in FIG. 8. At time 314, for example, a shift command may be issued by the processor to change the ratio from the third ratio to the fourth ratio. The processor will not immediately respond by supplying a target value of zero slip. Rather, an intermediate target value of perhaps 400 RPM will be fetched from memory. The target value depends upon the ratios that are involved in the shift as well as the throttle position and vehicle speed. As indicated earlier, however, the processor will not immediately respond to produce an intermediate target value of 400 RPM. Rather, it will produce a ramped desired slip curve 316 by multiplying the steady-state target slip, which is equivalent to the actual slip at point 318 by a maximum rate which is the calibrated value obtained from memory at the instant the shift is commanded at 314. Thus, the desired slip will vary as indicated by the ramped line 316 until it reaches the intermediate target slip value of 400 RPM.

In actual practice, the steps between 1020 RPM, indicated in FIG. 8, and the intermediate level of 400 RPM occurs in several ramped steps rather than a step of 600 RPM. Typically, the maximum RPM difference that is permitted by the processor is about 50 RPM per background loop.

After the steady-state condition at point 320 is reached, the processor will command again a further increment until a lower target value is reached. The lower target slip value is indicated in FIG. 8 at 322. This may represent a slip of about correspond, for example, to the slip that is detected at the completion of the shift as shown at point 324. Following completion of the shift, a PID control will occur in the same fashion as described previously to produce a ramped desired slip value 326 corresponding to ramped desired slip curve 316 and ramped desired slip curve 328, which appears intermediate the target values 400 RPM and 50 RPM. As the desired slip is ramped downward as shown at 326, the target value will slope downward at shown at 328 until the 100% shift completion point 330 is reached. This represents a transition to the so-called hard lock operating mode, which is described in the copending application identified above.

As seen in the graph of FIG. 10, every shift will have a unique function; that is, there will be a separate function for a 3-4 upshift, a 4-3 downshift, etc. There will be a separate shift complete constant as well for every target which is computed every background pass. The values for target engine speed in FIG. 9 are those speeds that are needed to achieve that target each background pass.

Figure 11:
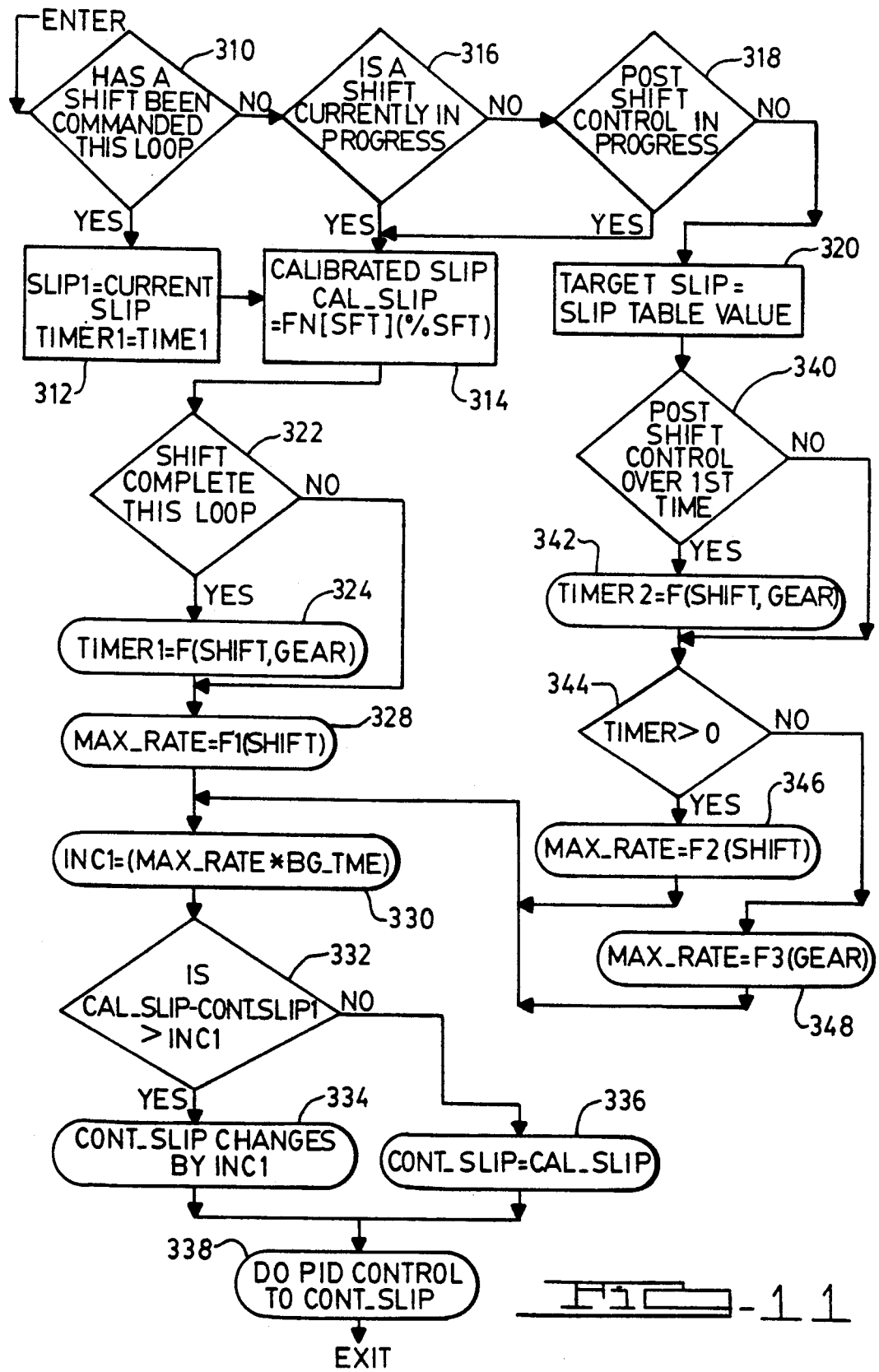
FIG. 11 is a control strategy flow chart that illustrates the process steps and control functions that are executed by the processor during a shift interval.

In FIG. 11, we have shown in the form of a software flow chart the steps involved in controlling the bypass clutch during a shift interval. Each of the software steps represents an event that occurs only one time in the background loop of the processor after the event is commanded for the first time.

The process begins at step 310, where an inquiry is made as to whether a shift has been commanded during the current background pass. If it has been commanded as shown at 270 in FIG. 9, the value for the current slip is measured in a "snapshot" fashion, and that value for slip is stored in temporary storage registry in the RAM portion of the memory. That value is used, as discussed previously with reference to FIG. 10, to calculate a target engine speed. The calculated engine speed is equal to the turbine speed at the start of the shift plus the target slip value indicated in FIG. 10, which is a function of the percent of shift complete value.

The current slip is observed at action block 312. At the same time, the timer is started at action block 312. Thus Timer 1 = Time 1.

The slip is calculated after the slip value is stored and the timer is started at action block 312 as the routine proceeds to action block 314. If the inquiry at step 310 is negative (i.e., if the shift has not been commanded), an inquiry then is made at step 316 as to whether a shift currently is in progress. A positive response then will result in advancement of the routine to step 314 as indicated above. A negative response at step 316 would indicate that the shift has reached the 85% complete point. An inquiry then is made at step 318 to determine whether the post shift control is in progress. If the post shift control is in progress, the routine then will proceed back to step 314 as indicated, where the slip is calibrated in the manner previously described to produce the ramp shown at 326 in FIG. 8. If a post shift control is not in progress, that indicates that the post shift control is completed and the routine then will proceed to establish a zero slip condition, or a slip condition near zero starting with action block 320, which will be described subsequently.

After the operation at action block 314 is completed, a check is made at action block 322 as to whether the shift has been completed during the current background pass. This is done by comparing the results of the computation of the percent shift complete value described above to a predetermined value, such as 85%. If the shift complete value is less than 85%, that indicates that the shift has not yet been completed during the current background pass and the response to the inquiry at 322 would be negative. On the other hand, if the shift complete value equals at least 85%, the response is positive and a timer is set at step 324. This timer can be the same timer that was used at action block 312 to establish a time limit for achieving a shift beginning with the shift command and ending with the 85% shift complete point. Since there is no further need for timing that event, the same timer can be used now for a different purpose and it is reloaded with a new time fetched from memory for establishing a time before which the shift must be completed between the 85% shift complete point and the point at which the final target value of zero percent, or a near zero percent value, is reached.

The slip tables used by the processor can have values of between 0 and 1020 RPM with 4 RPM resolution. A slip greater than 1020 RPM can be commanded by setting the maximum attainable slip target value in RPM greater than 1020. The final value of target slip, of course, determines the control mode. A target slip of between 0 and 4 RPM is normally considered to be a hard lock mode. A slip target value of between 4 and 500 RPM normally is considered to be an engaged mode. The target slip during the engage mode is achieved in a closed loop manner using the PID controller described above with reference to FIG. 5. The shift modulation logic described with reference to FIGS. 9, 10 and 11 controls the length of time after a shift is commanded that additional bypass clutch modulation occurs to effect a transient increase in slip until the shift is completed.

The routine then will proceed to step 328 where the maximum rate for the slip change is obtained from memory. That value is a function that depends upon the shift that is in place. The function being different for each ratio change, regardless of whether it is an upshift or a downshift. It is this value that determines the slope of the desired slip shown at 326 in FIG. 8. This is an event that follows the achievement of the 85% shift complete point 324. This establishes a maximum allowable rate of change; that is, the maximum rate that is allowed regardless of the target value that is specified. The actual desired slip that is detected by the PID controller for control purposes is the value indicated by the line 328 in FIG. 8. This value is input to the comparator 248 in FIG. 5 on the signal flow path 228 of FIG. 5.

The routine then proceeds to step 330 where the maximum RPM increment is determined as the slip approaches the desired slip. As indicated earlier with reference to FIG. 8. The controller will not allow a full RPM change from the present target value to a zero value in a single step. A maximum increment is established so that the target slip will change in steps as indicated in FIG. 8 until the zero target value is reached. At step 330, that maximum rate is multiplied by the background time for one loop of the processor. Having determined the maximum RPM increment at step 330, the routine then will proceed to step 332 where that increment is compared to the calculated slip. If the calculated slip is greater than the increment, the controlled slip will be allowed to change by the amount of that increment at step 334. This corresponds to the step from 400 RPM to 50 RPM in the graph of FIG. 8. On the other hand, if the difference between the calculated slip and the controlled slip is not greater than the increment determined at step 330, then the routine will be bypassed to step 336 where the controlled slip is set equal to the calculated slip. Thus, the controlled slip is allowed to reach a minimum value, and this is done in accordance with the PID control procedure previously described. This procedure occurs at step 338. The result of that procedure is a slip slope line of the kind shown at 328 in FIG. 8. In FIG. 8, the control slip is zero, but the actual slip could be chosen to be greater than zero; for example, 4 RPM.

The procedure indicated at steps 330 through 338 occurs during shifting and the processor will continue to proceed through these steps continuously, even after the shift has been completed.

In a post shift control procedure, which begins at 320. The process flow chart for the post shift control will terminate at step 320. The procedure previously described with reference to the shift control logic then will be carried out in the same fashion described previously.

The post shift control logic begins at step 320 as mentioned earlier. The target slip value indicated in step 320 usually is zero, but it could be some value other than zero. Target slip is set to some table value which depends upon throttle position and vehicle speed as described earlier, and is obtained using a table look-up.

The routine in the post shift control process then will proceed to step 340, where an inquiry is made as to whether the post shift control is over for the first time in the current background pass. If the post shift control is over, a transition will be made to the steady-state mode as the controlled slip is ramped down to the final target value. If the inquiry at step 340 is positive, a timer is set at 342. A separate time is set for the completion of the post shift control, depending upon the gear ratios that are involved in the shift. A check then is made at step 344 to determine whether the timer that is set at step 342 has expired. A negative response to the inquiry at step 340 will result in the routine proceeding directly to the timer check at step 344. If the timer has not expired, the post shift control then can continue. The max rate that is fetched from memory is set at step 346. This is similar to the max rate function described with reference to step 328. As in the case of the shift in progress procedure described above, every shift in the post shift control has a different rate depending upon the ratios that are involved in the ratio change.

If the inquiry at 344 is negative, that means the timer has run down. As indicated in FIG. 11, the flow diagram designates a non-shifting condition. The step 348 then determines a max rate of change of slip for the higher gear ratio in the upshift and the flow diagram then proceeds to step 330 where the routine passes through the previously described steps 330 through 338 to the exit.

Having described a preferred embodiment of the invention, what is claimed is:

1. An automatic transmission for use in an automotive vehicle driveline for delivering torque from a throttle controlled engine to vehicle traction wheels comprising:

multiple ratio gearing establishing plural torque flow paths from said engine to said traction wheels and a hydrokinetic unit having an impeller connected to said engine and a turbine adapted to be connected to torque input elements of said gearing;

a fluid pressure operated friction bypass clutch situated in said hydrokinetic unit adapted to selectively connect said impeller and said turbine to establish a mechanical torque bypass flow path around said hydrokinetic unit;

clutch means and brake means for controlling gear ratio changes;

said bypass clutch having a clutch capacity control chamber which, when pressurized, determines the torque transmitting capacity of said bypass clutch;

a control valve circuit including a fluid pressure source and shift valve means communicating with said clutch means and said brake means and with said pressure source;

bypass clutch control valve means for effecting controlled pressure distribution to said clutch capacity control chamber;

shift solenoid valve means for selectively actuating said shift valve means for effecting gear ratio changes;

vehicle speed sensor means for developing a vehicle speed signal;

turbine speed sensor means for developing a turbine speed signal;

engine throttle position sensor means for developing a throttle position signal;

engine speed sensor means for developing an engine speed signal; and electronic processor means for receiving said signals and for controlling operation of said shift solenoid valve means and said bypass clutch control valve means;

said processor means including means for modifying operation of said bypass clutch control valve means to effect a reduced bypass clutch capacity following a command of a ratio shift until said shift is completed;

said modifying means including means for developing a controlled increase in bypass clutch capacity following an initial bypass clutch capacity decrease during a shift, the amount of said controlled increase being functionally related to the percent of completion of said shift.

2. An automotive vehicle driveline having a throttle controlled internal combustion engine and a multiple ratio transmission, said transmission having gearing and a hydrokinetic torque converter with an impeller connected drivably to said engine and a turbine connected to torque input elements of said gearing;

a torque converter bypass clutch means for establishing a frictional driving connection between said impeller and said turbine;

a transmission control including means for effecting automatic ratio changes in said transmission during a shift interval in response to vehicle speed and engine throttle position changes; and means for modifying the torque transmitting capacity of said bypass clutch means following the initiation of a ratio change and for subsequently effecting an increase in said torque transmitting capacity during said shift interval, modification of said capacity by said capacity modifying means being functionally related at each instant during said shift interval to the percent of shift completion whereby shift smoothness results from the resulting reduction in rotary inertia forces in said driveline.

* * * * *